Feb. 1, 1955 B. M. OLIVER 2,701,274

SIGNAL PREDICTING APPARATUS

Filed June 29, 1950 2 Sheets-Sheet 1

INVENTOR
B. M. OLIVER
BY
Hugh S. Wertz
ATTORNEY

INVENTOR
B. M. OLIVER
BY Hugh S. Wertz
ATTORNEY

United States Patent Office 2,701,274

Patented Feb. 1, 1955

2,701,274

SIGNAL PREDICTING APPARATUS

Bernard M. Oliver, Morristown, N. J., assignor to Bell Telephone Laboratories, Incorporated, New York, N. Y., a corporation of New York Application June 29, 1950, Serial No. 170,978

3 Claims. (Cl. 178—5)

This invention relates to wide band transmission systems and, more particularly, to predictor devices for use in certain types of said systems.

In a copending application, Serial No. 170,977, filed June 29, 1950 there is disclosed a communication system in which there is effected a substantial reduction in the channel capacity required to transmit communication signals. It can readily be shown, by the application of certain principles of statistical mechanics to communication theory, that most present-day communication systems employ a channel capacity greater than that which is actually necessary to describe the message. That is, present-day systems provide sufficient channel capacity to transmit signals which are completely independent of each other, whereas typical communication signals (e. g., speech, music or television) exhibit a considerable degree of interdependence or correlation. By taking advantage of this correlation, the requisite channel capacity of a system can be materially lessened, and to the extent that this correlation is not made use of, the system is "inefficient." The invention of the copending application eliminates a substantial portion of the redundancy in communication signals by periodically sampling the message wave, by predicting the succeeding value of the message wave sample, by comparing the predicted value with the actual value, and then by transmitting only the difference, i. e., the error in prediction. Accurate prediction is made possible by the existence of correlation in the signal. At the receiver there is a device which makes a prediction identical to that at the transmitter, and this predicted signal is algebraically added to the received error signal to yield a replica of the original message signal.

It is the principal object of the present invention to make accurate predictions of successive signal samples, these predictions being made on the basis of data available in the signal.

The present invention, in one of its more important aspects, relates to a linear invariant predictor which predicts on the basis of the weighted sum of several preceding signal values. It is invariant in the sense that its method of prediction does not change with time or with the signal. It is linear in that its prediction is a linear function of the signal data which it receives. In accordance with the invention and in furtherance of its broad object, this predictor is fundamentally a delay line tapped at intervals corresponding to the time periods between successive signal samples, with variable attenuators in the taps to give the desired weight to each sample. The sum of these weighted samples constitutes the prediction.

Because of the high correlation to be found in television image pictures, the invention is particularly applicable to the transmission of that class of message wave. Thus, speaking in television terms, by way of example, in another embodiment of the invention, the utilization of samples from a preceding line is made possible by the use of acoustic delay means to delay the signal one line time. Storage tube delaying means may also be employed to permit the utilization of previous frame or field samples.

The invention will be more fully understood from the following detailed description of certain illustrative embodiments thereof taken in connection with the appended drawings, in which.

Figures 1, 2:
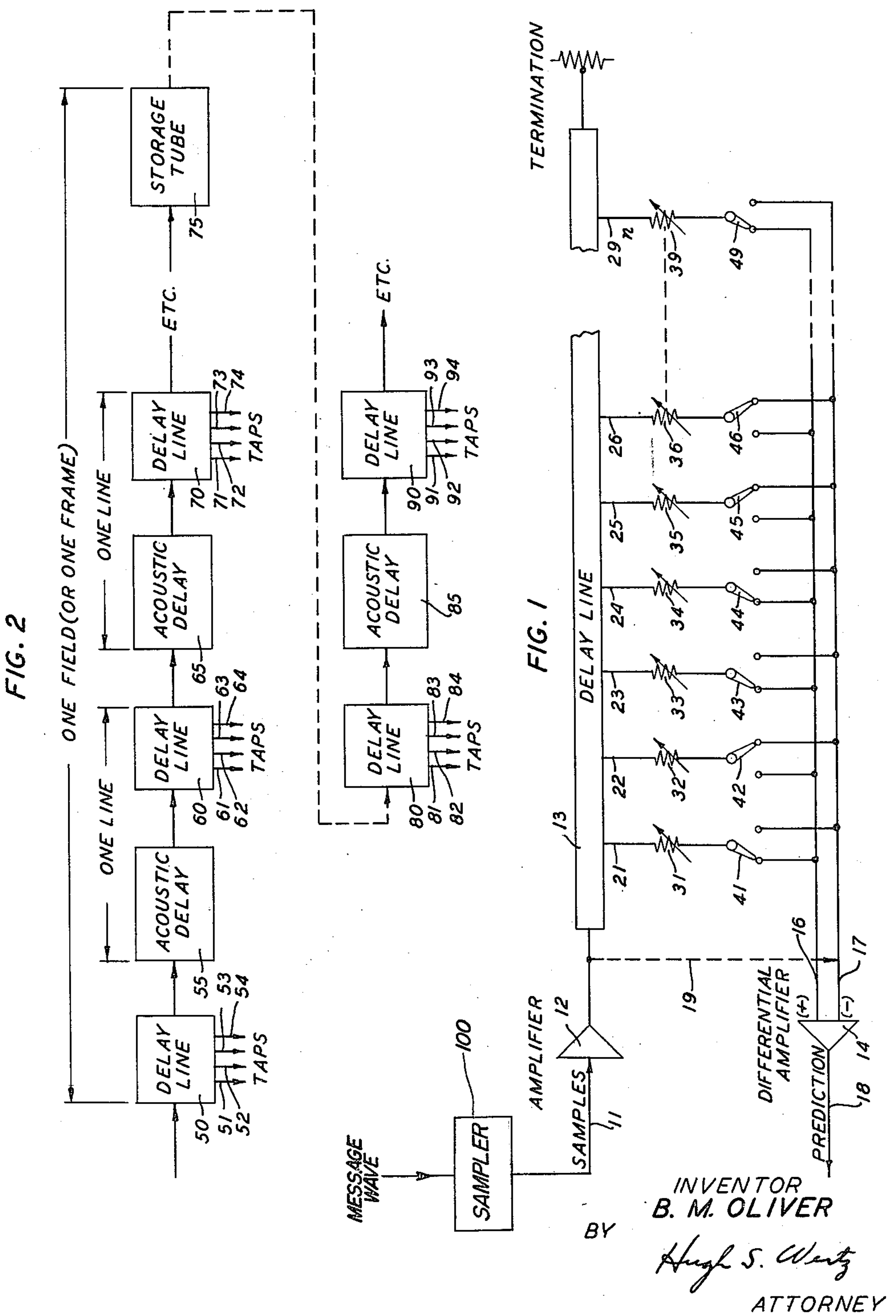
Fig. 1 is a schematic illustration of one exemplary embodiment of the linear invariant computer.
Fig. 2 is a schematic block diagram of a computer arrangement in which acoustic delay means and storage tube delay means are employed.

In Fig. 1 there is shown a simple illustrative embodiment of the invention. This linear invariant predictor 10 always gives a prediction which is the algebraic sum of certain past samples, each multiplied by an appropriate coefficient. Since it is desired to specify the signal completely by these derived samples, the wave is sampled at times uniformly spaced $$\frac{1}{2W_0}$$

seconds apart where $W_0$ is the width of the frequency band of the message wave. This interval is commonly designated in the art as a Nyquist interval. The signal samples 11 from any suitable sampling device 100 are passed into a delay line 13 and can, in accordance with the invention, be amplified in amplifier 12 before being fed into this delay line. The taps 21, 22, 23, . . . 29 on this delay line are separated by the interval between successive samples. Thus, if the sample to be predicted is just being applied to the line, the signal at tap 21 is the previous sample, the signal at tap 22 is the one before that, etc. Variable attenuators 31, 32, 33, . . . 39 determine, by their settings, the fractions of the voltages appearing at the taps 21, 22, 23, . . . 29 which are to be added and applied to one or the other of the two inputs of a differential amplifier 14. This amplifier gives a positive output if a positive voltage is applied to its input 16, marked (+), and a negative output if a positive voltage is applied to its input 17, marked (—). The output is thus always proportional to the voltage difference on the two input leads 16 and 17, and hence the name "differential amplifier." Whether a voltage appears at the positive or the negative input of the differential amplifier is determined by the position of switches 41, 42, 43, . . . 49, respectively, through which the several attenuated tapped voltages are fed to the amplifier. It is obvious that the output 18 of the differential amplifier 14, i. e., the predicted value of the signal sample, can be represented algebraically as:

$$S_p=a_1S_1+a_2S_2+a_3S_3+\cdots+a_nS_n=\sum_1^n a_iS_i$$

where the subscripts correspond to the taps on the delay line and the magnitude of the coefficients ($a_1$, $a_2$ . . . $a_n$) indicate the attenuator settings. The sign of these coefficients depends, of course, on which amplifier input, 16 or 17, is chosen.

There is naturally a question as to how many previous samples should be taken into account, i. e., how many taps and how much delay is required in the structure of Fig. 1. The answer necessarily depends on the signal statistics. In certain signals, the nature of the correlation is such that an accurate prediction can be made using only a few past samples $S_1$, $S_2$ . . . . That is, the more ancient samples are only slightly correlated with the present sample and offer a negligible contribution to the prediction. Speaking in terms of the coefficients $a_1$, $a_2$ . . . $a_n$, this means that the coefficients corresponding to even relatively small values of $n$ have little effect on the predicted value. In other signals, however, very many samples may be necessary to make $a_n$ zero or negligibly small. Stated differently, the more ancient samples in these other signals are highly correlated with the present sample and offer an important contribution to the prediction.

Since the transmission of television image signals is of considerable importance, an examination of the nature of such signals will offer a valuable illustration. In television, the scanning process converts a function (brightness) of three variables $b=b\ (x, y, t)$, where $x$ and $y$ are space coordinates and $t$ is time, into a function of one variable, time alone. As a result of this remapping, elements which are neighboring but not on the same scanning line are separated in the signal by approximate multiples of a line scanning time. Similarly, the signals representative of the same element separated by frame or field times are necessarily closely related, so that there is of course high correlation between corresponding elements in successive frames. To make full use of the linear correlation in a television picture, therefore, the delay line 13 of Fig. 1 should have a total delay of several line times or, better still, of several frame times. With such an arrangement, taps on the line would, however, only be required at delays corresponding to samples representing elements in the space time vicinity of the element (and sample) under consideration. But rather than use a single long delay line, it is more practical to employ large blocks of delay for the line times separated by short delay lines to provide access, and for the frame or field time delays, still longer blocks of delay or storage tubes. One such preferred embodiment which is in accordance with the invention is shown, for purposes of illustration, in Fig. 2.

Figure 3:
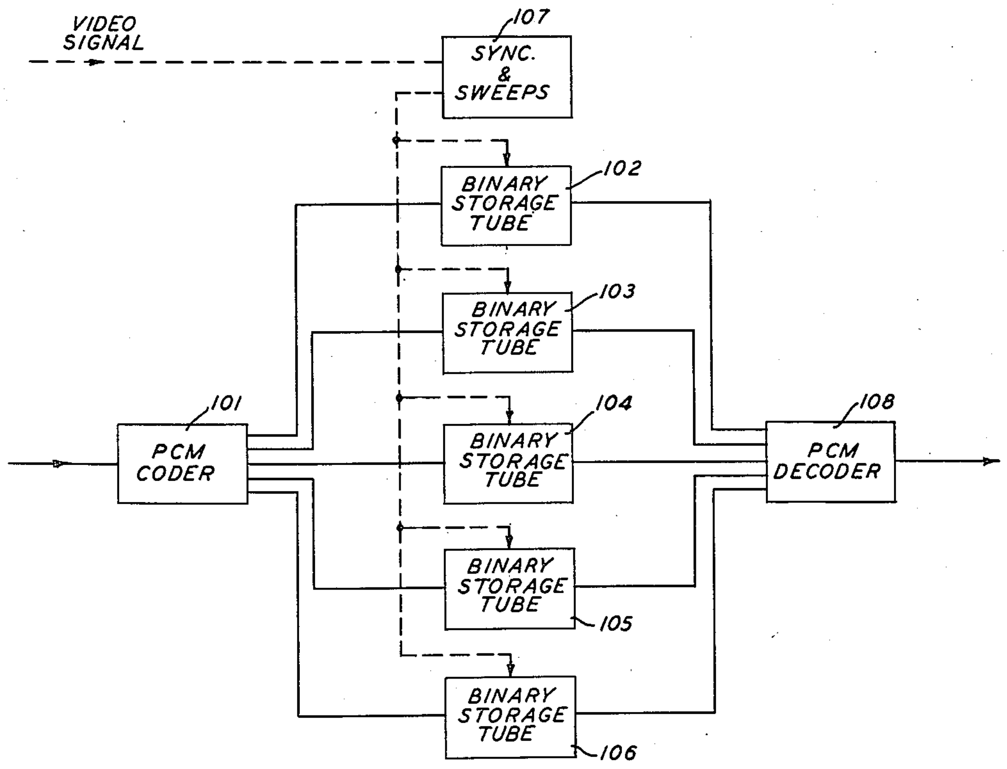
Fig. 3 is a schematic block diagram of a storage tube delaying means which can be employed in the practice of the invention.

Delay lines 50, 60, 70, 80, 90, etc., fitted with taps 51 through 54, 61 through 64, 71 through 74, 81 through 84, 91 through 94, etc., are quite like the delay line 13 of Fig. 1, fitted with its taps 21, 22, . . . 29. The delay lines of Fig. 2, though drawn with four taps each for purposes of simplicity of exposition, can, in accordance with the invention, have more or less than that number, depending on the nature of the signal being operated upon, as discussed above. The details of the taps, i. e., the variable attenuators, the selective switches, etc. have similarly been omitted for convenience of illustration. Acoustic delay lines 55, 65, 85, etc., are feasible means for effectuating the line time delays which are in accordance with this embodiment of the invention. A storage tube 75 is employed to insert the extremely long delay necessary to achieve a total delay of a field or frame time. While this delay has been shown in Fig. 2 as a single storage tube 75, the present state of the art is such that greater reliability is afforded by an arrangement such as that shown in Fig. 3. In that figure, a PCM coder 101, which can be any of the coders which are well known in the art for such purposes, is employed to encode each signal sample as a number of pulses, each of which represents a binary digit. In accordance with standard pulse code modulation practice, the number $n$ of digits is determined by the number of quantization levels. The relationship is, of course, that $n$ digits correspond to $2^n$ levels. In the simple illustrative embodiment shown in Fig. 3, the coder output consists of five digits, corresponding to thirty-two levels of quantization. These five pulses are, respectively, fed to five binary storage tubes 102, 103, 104, 105, and 106, which can, in accordance with the invention be of the same general type as the binary electrostatic storage device described in the pending application of A. M. Clogston, Serial No. 169,140, filed June 20, 1950. These storage tubes are controlled by a group of synchronization and sweep circuits 107, which are activated by the original video signal. Among the elements of these synchronization and sweep circuits 107 is, of course, a synchronization stripper which acts on the video signal. The several delayed outputs of the binary storage tubes are then fed to a standard PCM decoder 108, which yields a delayed version of the signal sample input, as called for by the practice of the invention. It is obvious that any number of binary storage tubes can be employed, depending on the number of quantization levels, and the illustration chosen, in which $n$ equals 5, has no especial significance. As has been stated, the arrangement of Fig. 3 is simply one illustrative arrangement of the storage device 75 in Fig. 2.

It is obvious that intermediate amplifiers, modulators, detectors and other like devices are necessary for the effective operation of this arrangement of the invention, but to show them in Fig. 2 would in nowise facilitate comprehension thereof and would derogate from its forthrightness of exposition. By utilizing the structure of Fig. 2, all the pertinent past of the signal can be made available for the prediction of each element. This pertinent past would in general consist of those samples representing all elements lying in the vicinity of the element under consideration in what may be thought of as a sort of prolate semispheroid around the element and extending back in time through previous frames.

It is of course within the ambit of the invention not to use the entire structure of Fig. 2, but merely to employ delays of one or two lines so as materially to improve the prediction afforded by the arrangement of Fig. 1 by increasing the dimensionality upon which the prediction is based. It is, for example, in general true that the prediction afforded by the three previous samples along one line is inferior to that afforded by the use of one previous element on that line and the two elements on the line immediately above, thus:

$$\begin{matrix} S_{11} & S_{10} \\ \circ & \circ \\ \\ \circ & \circ \\ S_{01} & S_{00} \end{matrix}$$

where $S_{00}$ is the element to be predicted. For purposes of illustration, the arrangement can be considered where the prediction is set such that $$S_p = S_{10} + S_{01} - S_{11}$$

In the case that the brightness in the neighborhood of $S_{00}$, as a function of $x$ and $y$, is a plane sloped in any direction, the prediction thus afforded will be perfect. This particular combination would also predict quite well across vertical or horizontal edges. It is to be noted that the arithmetic sum of the weighting characteristics which in this case are 1, 1, and −1, is equal to unity. It can be seen that because of the linear nature of the prediction the arithmetic sum of the weighing characteristics should generally be approximately equal to unity if the maximum redundancy is to be removed.

It is to be understood that the above-described arrangements are illustrative of the application of the principles of the invention. Numerous other arrangements may be devised by those skilled in the art without departing from the spirit and scope of the invention.

What is claimed is:

1. In a transmission system in which there is transmitted the difference between the instantaneous amplitude of a continuously-variable message wave and a prediction of said amplitude based on its past history, an arrangement utilizing such prediction and located at the transmitter, comprising means for sampling said message wave at predetermined intervals, a multi-tap delaying means to receive the samples of said message wave and having the taps spaced at intervals corresponding to an integral number of sampling intervals, weighting means in series with each of said taps, the weighting characteristics being chosen in accordance with the signal statistics and having their arithmetic sum approximately equal to unity, means for combining in time coincidence the outputs of at least one of said weighting means in the same polarity as the signal to be predicted, the output of more than one weighting means in opposite polarity with respect to the signal to be predicted and the signal to be predicted to obtain the difference for transmission.

2. In a television transmission system in which a picture scene is scanned in a pattern of successive parallel lines to obtain a continuous message-wave having the signal representing adjacent picture elements of successive lines spaced by a line-time and which transmits the difference between the amplitude of said message wave and a prediction of said amplitude based in part on its value one line-time earlier, an arrangement utilizing such prediction comprising means for sampling said message wave at specified intervals, a multi-tap delay means to receive the samples of said message wave and having the taps spaced at intervals corresponding to an integral number of sampling intervals, weighting means in series with each of said taps, the characteristics of said weighting means being chosen in accordance with the signal statistics and having their arithmetic sum approximately equal to unity, and means for combining in time coincidence the outputs of the tap spaced one line-time from the signal to be predicted and the tap spaced one sampling interval from the signal to be predicted for deriving a signal prediction and subtracting said signal prediction from the sample it predicts to obtain the difference for transmission.

3. In a television transmission system in which a picture scene is scanned in a pattern of parallel lines forming successive interlaced fields to obtain a continuous message-wave having the signal representing adjacent picture elements of successive lines spaced by a predetermined time, and which transmits the difference between the amplitude of said message wave and a prediction of said amplitude, based in part on the value of a sample from the preceding field, an arrangement utilizing such prediction comprising means for sampling said message wave at specified intervals, a multi-tap delay means to receive the samples of said message wave and having the taps spaced at intervals corresponding to an integral number of sampling intervals, weighting means in series with each of said taps, the characteristics of said weighting means being chosen in accordance with the signal statistics and having their arithmetic sum approximately equal to unity, and means for combining the outputs of the tap spaced one half of a line-time from a sample one field-time from the signal to be predicted and the tap spaced one sampling interval from the signal to be predicted for deriving a signal prediction and subtracting said signal prediction from the signal to be predicted to obtain the difference for transmission.

References Cited in the file of this patent

UNITED STATES PATENTS

| | | |
|---|---|---|
| 2,236,134 | Gloess | Mar. 25, 1941 |
| 2,310,692 | Hansell | Feb. 9, 1943 |
| 2,552,386 | Sziklai et al. | May 8, 1951 |
| 2,580,421 | Guanella | Jan. 1, 1952 |
| 2,657,253 | Bedford | Oct. 27, 1953 |

FOREIGN PATENTS

| | | |
|---|---|---|
| 605,128 | Great Britain | July 16, 1948 |